United States Patent [19]

Szuminski et al.

[11] Patent Number: 4,552,309
[45] Date of Patent: Nov. 12, 1985

[54] VARIABLE GEOMETRY NOZZLES FOR TURBOMACHINES

[75] Inventors: Gary F. Szuminski, Marietta, Ga.; Thomas J. Jones, Bristol, England

[73] Assignees: Rolls-Royce Inc., New York, N.Y.; Rolls-Royce Limited, London, England

[21] Appl. No.: 696,869

[22] Filed: Jan. 30, 1985

Related U.S. Application Data

[63] Continuation of Ser. No. 376,389, Apr. 7, 1982, abandoned.

[51] Int. Cl.[4] ............................................. B63H 11/10
[52] U.S. Cl. ........................... 239/265.19; 239/265.39; 244/12.5; 244/110 B; 60/228
[58] Field of Search ............... 239/265.19, 265.29, 239/265.39, 265.41; 60/232, 228, 262, 271, 430, 465; 244/110 B, 12.5

[56] References Cited

U.S. PATENT DOCUMENTS

| | | | |
|---|---|---|---|
| 2,831,321 | 4/1958 | Launcher | 60/35.6 |
| 3,024,601 | 3/1962 | Sollinger | 60/35.6 |
| 3,403,858 | 10/1968 | Kurti | 239/265.39 |
| 4,049,199 | 9/1977 | Nightingale | 239/265.39 |
| 4,196,856 | 4/1980 | James | 239/265.39 |
| 4,245,787 | 1/1981 | Freid | 239/265.41 |
| 4,311,276 | 1/1982 | Hall | 239/265.39 |
| 4,440,346 | 4/1984 | Wiley | 239/265.39 |
| 4,440,347 | 4/1984 | Madden | 239/265.39 |
| 4,447,009 | 5/1984 | Wiley et al. | 239/265.39 |
| 4,463,903 | 8/1984 | Nightingale | 239/265.39 |

FOREIGN PATENT DOCUMENTS 796093 6/1958 United Kingdom .
833250 4/1960 United Kingdom .
951130 3/1964 United Kingdom .

OTHER PUBLICATIONS

OLS-3242822, 3242823, 3242824–Germany as U.S. Equivalents.

*Primary Examiner*—Donald P. Walsh
*Attorney, Agent, or Firm*—Cushman, Darby & Cushman

[57] ABSTRACT

An exhaust nozzle for a gas turbine engine comprising a duct 17(c) extending along an axis and having at a downstream end thereof a mechanism for varying the geometry and area of the nozzle. The mechanism 28 comprises an axially translatable member 28 which has a face 29 extending in a direction transverse to the axis of the duct 17(c) against which pressurized gases flowing through the duct acts to balance out the loads on the flaps. A plurality of flaps 38,43 are spaced circumferentially around the axis of the duct. The flaps 38 are pivotally attached to the axially translatable member 28 and are provided with a cam follower 40 that co-operates with a cam 37. The cams 37 are fixed relative to the duct 17(c) and thereby defines the attitude of each flap 38 relative to the member 28. Seal plates 41 and 45 cover the gaps between adjacent flaps 38 and 43 to the seal plates 45. A plurality of struts interconnect the member 28 and the second flaps of the pivotal attachment of the flaps 43 to the flap 38. A set of flaps 47 are provided to provide fairing between the downstream ends of the member 28 and the flaps 43. In operation axial movement of the member 28 moves the flaps 38 and 43 to different positions.

7 Claims, 3 Drawing Figures

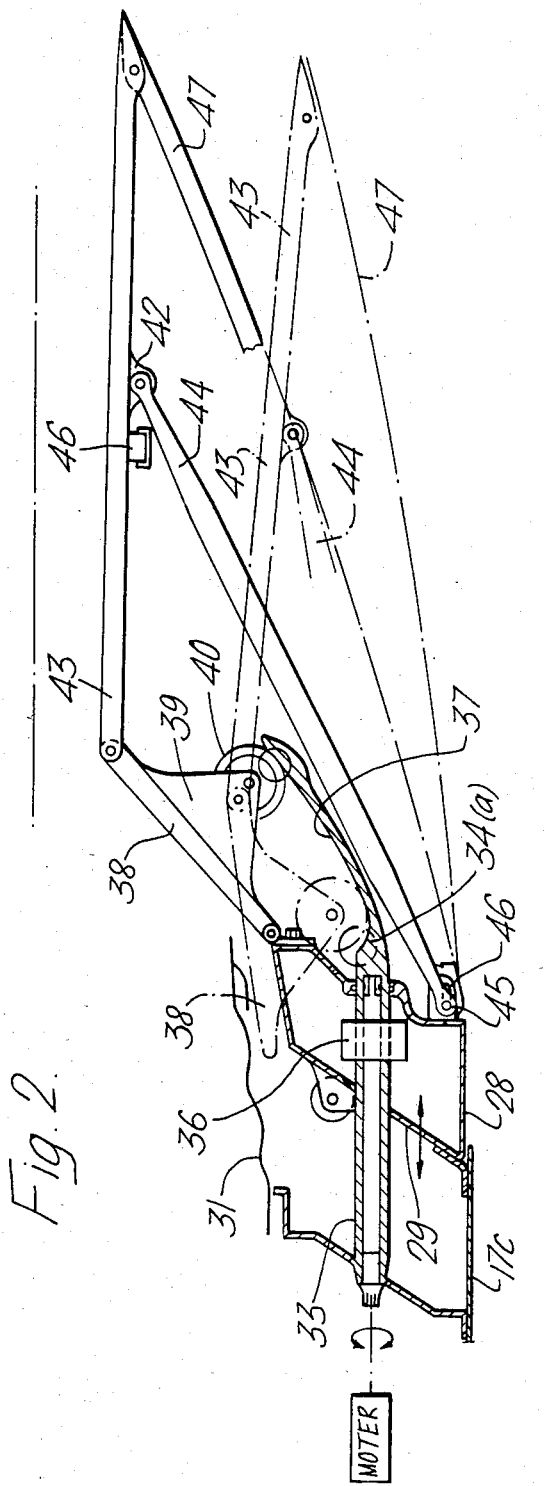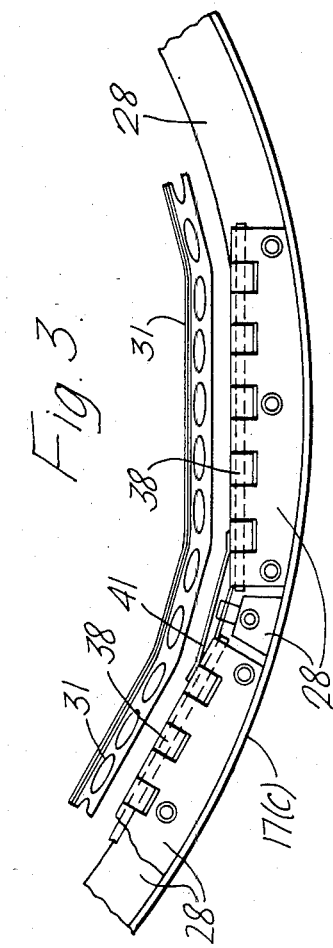

VARIABLE GEOMETRY NOZZLES FOR TURBOMACHINES

This is a continuation of application Ser. No. 376,389, filed Apr. 7, 1982, which was abandoned upon the filing hereof, now abandoned.

This invention relates to variable area nozzles for turbomachines and is particularly, although not exclusively, concerned with nozzles that can be swivelled to vary the direction of thrust produced by the turbomachines.

Afterburning or reheat is a method of augmenting the basic thrust of a gas turbine engine and comprises the introduction and burning of additional fuel between the engine turbine and the jet pipe nozzle utilizing the unburnt oxygen in the exhaust gases to support the combustion.

Also, with engines such as the Rolls-Royce Limited's Pegasus engine in which cold by-pass air is discharged from vectorable "cold" nozzles, it is known to burn additional fuel in the air stream supplied to the nozzles to increase thrust. This is commonly referred to as plenum chamber burning (P.C.B.).

In both reheat and P.C.B. modes of operation, it is necessary to be able to increase the outlet area of the respective nozzle, to give an area suitable for the resultant increase in the volume of the gas stream to prevent any increase in pressure occurring that would otherwise affect the efficient functioning of the engine. The actual area of the nozzle is dictated by many factors which affect the mass flow of air through the engine, such as for example, altitude, ambient temperature, forward speed of the aircraft, and speed of the engine.

With nozzles that are swivellable, the mechanism for varying the area of the outlet must be simple to operate, capable of being operated independently of the mechanism for swivelling the nozzle, robust, and lightweight so as not to impose unacceptable loads on the mechanism for supporting and swivelling the nozzle.

The invention as claimed provides a variable area nozzle for a turbomachine, which is simple to operate, robust and lightweight. The nozzle is also suited for use as a swivellable nozzle.

The invention will now be described, by way of an example, with reference to the accompanying drawings in which:

FIG. 2 illustrates in more detail a sectional elevation of part of the rear nozzle of the engine shown in FIG. 1, and, FIG. 3 shows in greater detail part of the set of first flaps of the nozzle of FIG. 2.

Figure 1:
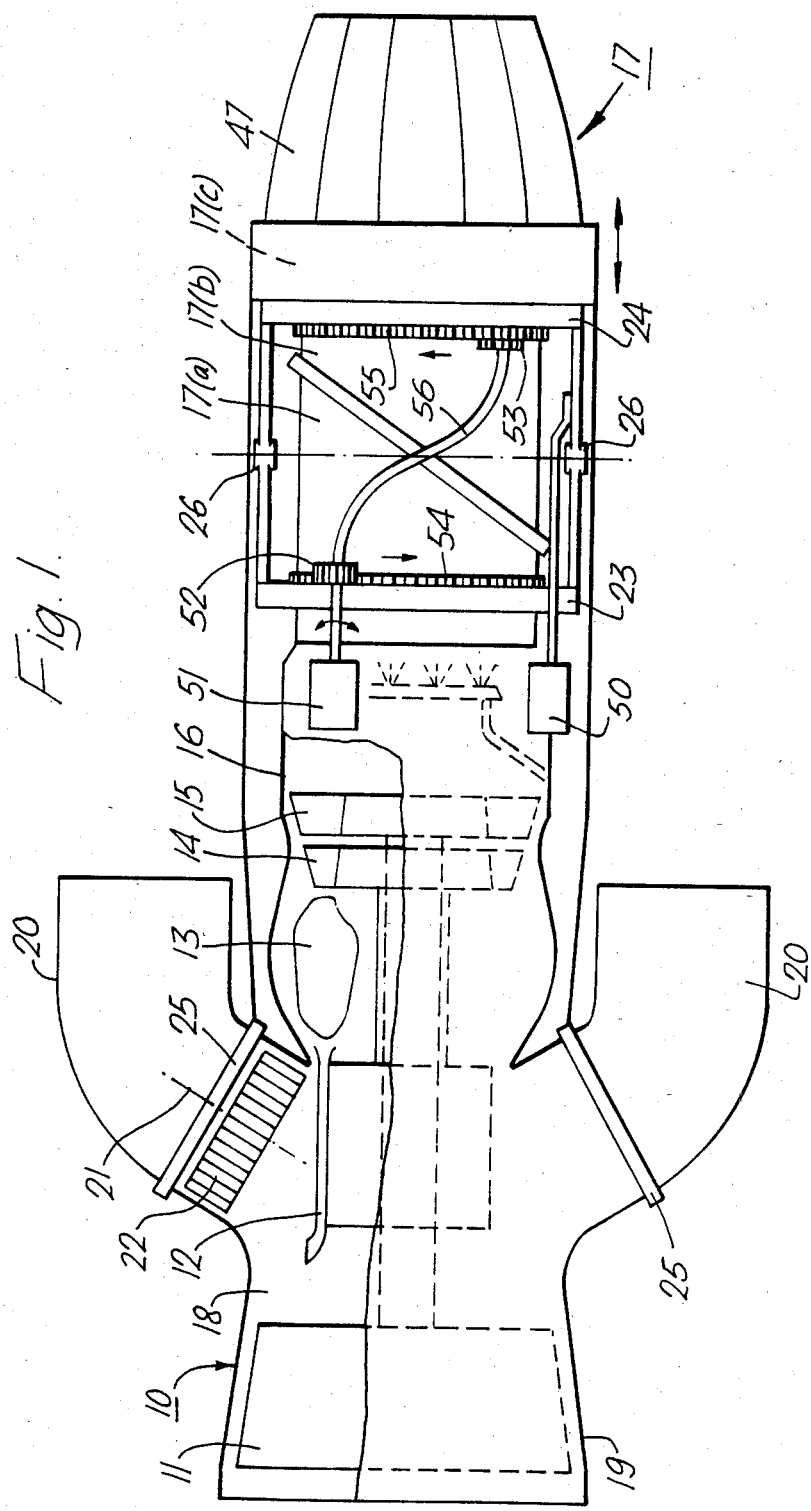
FIG. 1 illustrates schematically a gas turbine aero-engine incorporating three vectorable nozzles. For convenience only one of the nozzles is shown constructed in accordance with the present invention.

Referring to FIG. 1 there is shown schematically a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable variable area nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 25 for rotation through an angle of approximately 110° about an axis 21.

Additional combustion equipment 22 is provided in the plenum chamber 18 so that additional fuel can be burnt in the air stream ejected through the nozzles 20 to increase the thrust. To enable the engine to run efficiently the nozzles 17 and 20 are provided with variable-area, variable-geometry outlets and are constructed in accordance with the present invention.

For convenience the invention will be more particularly described with reference to nozzle 17 but it is to be understood that the mechanism for varying the area and geometry is similar for all the nozzles 17 and 20, and may also be used with nozzles for fixed jet pipes.

The nozzle 17 is of the type in which a scarfed rotatable duct 17(a) is mounted in bearings 23 on the downstream end of the jet pipe 16, and a second scarfed duct 17(b) is mounted in bearings 24 for rotation in the opposite direction to that of duct 17(a). The bearing 24 is, in turn, rotatable bodily on trunnions 26 which extend transverse to the axis of duct 17(b). This type of nozzle is described in more detail in co-pending U.S. Patent Application No. 376388 entitled Vectorable Nozzles For Turbomachines naming the present inventors and assigned jointly to Rolls-Royce Incorporated and Rolls-Royce Limited. In operation the bearing 24 is rotated about the axis of the trunnions 26 by means of a screw jack (shown schematically by the numeral 50) which pushes on the brackets that support the bearing 24 in the trunnions 26. As the bearing 24 is swung about the axis of the trunnions 26 the ducts 17(a) and 17(b) are rotated in opposite directions by means of a motor 51 and sprockets 52,53, chain drives 54,55 and flexible drive shaft 56 as explained in the above-mentioned U.S. patent application.

The nozzle 17 has at its downstream end a duct 17(c) which is carried by the fixed race of the bearing. It is this duct 17(c) that is provided with the mechanism for varying the geometry and area of the outlet of the nozzle 17 in accordance with the present invention, as shown in FIGS. 2 and 3.

Referring to FIGS. 2 and 3, the mechanism for varying the geometry and area of the outlet nozzle comprises an annular member 28 which is translatable axially and on which is carried three sets of flaps as will be described below. The member 28 is mounted to slide axially inside the downstream end duct 17(c) and the member 28 comprises an annular hollow box structure which has a face 29 extending in a direction transverse to the axis 30 of the duct 17(c). Pressurised gas flowing through duct 17(c) acts on face 29 to urge the member 28 rearwards.

The member 28 slides inside the bore of duct 17(c) and a heat shield liner 31 is provided to protect the duct 17(c) and the member 28 from the hot gases flowing through the nozzle when the reheat combustor 32 in the jet pipe is ignited.

The member 28 is supported on axially extending tubes 33 which carry an annular cam-ring assembly 34.

Located in at least some of the tubes 33 is a lead screw 35 of a screwjack which engages a nut 36 (of the recirculating ball type) fixed to the member 28. Rotation of the lead screws 35 by a motor drive through gearboxes pushes and pulls the member 28 to-and-fro in the axial direction.

The cam ring assembly 34 comprises two polygonal frameworks of tubes 34(a) interconnected by which a plurality of cams 37 facing inwards (only one of which is shown). The cams 37 are equispaced around the axis 30.

A set of first primary flaps 38 is pivotally attached to the member 28. Each first primary flap 38 is pivotally attached at its upstream end to the downstream inner circumferential end of the member 28 and has a web 39 projecting from its outer facing side. The web 39 carries a cam follower 40, in the form of a roller, that engages one of the cams 37 to define and vary the attitude of the flap 38 relative to member 28 as member 28 is moved in axial directions.

The flaps 38 comprise a hollow structure with spaced walls which are made from a carbon-carbon material such as Pyrocarb (Registered U.S. Trade Mark) material as manufactured by Hitco of USA). Pyrocarb materials comprise a carbon matrix in which is embedded a woven cloth of carbon fibres. The material is protected from oxidation either by overcoating it with a non-oxidising protective layer or by impregnating silicon into it and converting the silicon to silicon carbide.

A second primary flap 43 is pivotally attached at its upstream end to the downstream end of each first primary flap 38. Each flap 43 is a hollow structure of spaced carbon-carbon walls similar to flaps 38, and each flap 43 is provided with a lug 42 partway along its length.

The flaps 38 are spaced apart circumferentially and each of the gaps between the flaps 38 is closed off by thin seal plate 41 (see FIG. 3 which is a section through the hinge between flaps 38 and the member 28). The seal plates 41 are located on the inward-facing side of the flaps 38 and are constrained from falling inwards by means of rollers 46 that engage the outside surface of the flaps 43. The seal plates 41 accommodate different positions of the flaps 38 by sliding circumferentially.

A plurality of struts 44 are pivotally attached at one of their ends to a downstream outer circumference of the member 28. Each of the struts 44 is pivotally connected at its outer end to the lug 42 of one of the second flaps 38.

Here again, the second flaps 43 are spaced circumferentially and the gaps between them are closed-off by thin carbon-carbon seal plates 45 that are pivotally attached at their upstream end to the downstream end of the seal plates 41. The seal plates 45 are located on the inward-facing side of the flaps 43 and are constrained from falling inwards by rollers 46 which are mounted on flanges that project through the gaps between flaps 43 to engage the outer surface of the flaps 43. The seal plates 45 allow the flaps 43 to assume different positions where they define a convergent part of the nozzle to where they define a divergent part of the nozzle by sliding relative to the flaps 43. The seal plates 45 do not have lugs 42 and no struts 44 are connected to the seal plates 45.

A set of third flaps 47 made of a carbon fibre reinforced polyimide material are provided on the member 28. Each of the third flaps 47 is pivotally attached at their upstream end to the downstream end of the member 28, and are pivotally attached at their downstream ends to the downstream end of one of the second flaps 38. The pivot 45 at the upstream end of the third flaps 47 locates in an elongated hole 46 in the member 28.

The flaps 47 overlap each other to accommodate the different positions of the flaps 47.

In operation of the nozzle with the member 28 in the fully rearwards position shown in solid lines in FIG. 2, the flaps 38 define a convergent part of the nozzle and the flaps 43 define a parallel or slightly divergent part of the nozzle with the throat area of the nozzle (in a radial plane of the pivotal connections between the flaps 38 and 43) at a minimum dimension. This configuration would be used for a subsonic dry maximum thrust mode of operation such as for take-off, or subsonic accelerations.

By pulling the member 28 forwards the cam followers 40 move along the cams 37 and the flaps 38 define a parallel or slightly convergent part of the nozzle (as shown with dotted lines) a maximum area throat, and flaps 43 define a divergent part of the nozzle with a maximum area exit at the downstream ends of flaps 43. This configuration would be used for maximum thrust with reheat or P.C.B. mode of operation such as would be required for supersonic cruise flight or accelerations.

The gas loads on the flaps 38 and 43 and seal plates 41 and 45 are transmitted back to the member 28 and exert a net force forwards (i.e. towards the jet pipe 16) on the member 28. Accordingly, by exposing the front face of the member 28 to the pressurised gases flowing through the duct 17(c) the gases exert a rearward force on the member 28 that partly counterbalances the forward loads exerted on the member 28. This in turn reduces the forces required to move the member 28 in axial directions. The area of the front face 29 of the member can be chosen to achieve the optimum rearwards force on the member 28.

Clearly, at intermediate positions between those shown in solid and dotted lines in FIG. 2 various combinations of convergence and divergence with different throat areas can be obtained.

As flaps 38 and 43 take up different positions the seal plates 41 and 45 slide to fill up the gaps between the respective flaps 38 and 43. Also, the flaps 47 are moved to alter the boat-tail angle and thereby reduce base drag.

We claim:

1. An exhaust nozzle for a gas turbine engine comprising a duct extending along an axis and having at a downstream end thereof a mechanism for varying the geometry and area of the nozzle, the mechanism comprising an axially translatable member which has a face extending in a direction transverse to the axis of the duct against which pressurised gases flowing through the duct acts to bias the member in a direction along the duct, a plurality of first flaps spaced circumferentially around the axis of the duct each of which is pivotally attached at its upstream end to the axially translatable member, each first flap being provided with a cam follower that co-operates with a cam that is fixed relative to the fixed duct thereby to define the attitude of each first flap relative to the member, a plurality of first seal plates each of which is pivotally attached at an upstream end to the member and positioned to cover the gap between adjacent first flaps, a set of circumferentially spaced second flaps each of which is pivotally attached at its upstream end to the downstream end of a first flap, a plurality of second seal plates each of which is pivotally attached at an upstream end to the downstream end of one of the first seal plates and positioned to cover the gap between two adjacent second flaps, a plurality of struts each of which is pivotally connected at one end to the member and pivotally connected at another end to a second flap at a region of the second flap downstream of the pivotal attachment of the second flap to the first flap, and a plurality of third flaps each of which is pivotally attached at one end to the member and pivotally attached at its other end to the downstream end of one of the second flaps.

2. A nozzle according to claim 1 wherein the axially translatable member is a right circular cylindrical annular structure which is moved axially by means of one or more lead screws which is rotatable in a nut which is carried by the member and the first flaps and first seal plates are pivotally mounted on an inner circumference of the annular member, and the third flaps are pivotally mounted on an outer circumference of the annular member.

3. A nozzle according to claim 2 wherein the annular member is mounted to slide axially on axially extending supports and the supports carry an annular framework that defines a plurality of axially extending cam surfaces spaced around the axis of the annular framework.

4. A nozzle according to claim 3 wherein the cam surfaces face inwards and each first flap is provided with the cam follower on its outer facing side.

5. A nozzle according to claim 2 wherein the axially translatable member slides in the bore of the duct and a sliding seal means is provided between the member and the duct.

6. A nozzle according to claim 1 wherein roller means which contact the outward facing sides of the first flaps are provided on each of the first seal plates.

7. A nozzle according to claim 1 wherein roller means which contact the outward facing sides of the second flaps are provided on each of the second seal plates.

* * * * *